United States Patent [19]

Harazono et al.

[11] 3,869,710

[45] Mar. 4, 1975

[54] MAGNETIC TAPE DUPLICATING DEVICE

[75] Inventors: Sinichi Harazono, Katano; Toshinori Morikawa, Neyagawa, both of Japan

[73] Assignee: Matsushita Electric Industrial Co., Ltd., Osaka, Japan

[22] Filed: Aug. 7, 1973

[21] Appl. No.: 386,340

[30] Foreign Application Priority Data

Aug. 16, 1972 Japan .............................. 47-81921

[52] U.S. Cl. ...................... 360/17, 242/74, 242/195

[51] Int. Cl.... G11b 5/86, G11b 15/66, B65h 75/28

[58] Field of Search .............. 179/100.2 E, 100.2 Z; 178/6.6 A; 242/74, 74.1, 78.8, 78.3, 195; 274/11 F, 46 D; 360/15-17

[56] References Cited

UNITED STATES PATENTS

| | | | |
|---|---|---|---|
| 3,136,464 | 6/1964 | Schmid | 242/74 |
| 3,521,829 | 7/1970 | Wangerin | 242/74 |
| 3,598,926 | 8/1971 | Umeda | 179/100.2 T |
| 3,627,917 | 12/1971 | Kobayashi et al. | 178/6.6 A |
| 3,698,654 | 10/1972 | Rosenburgh | 242/74 |
| 3,752,416 | 8/1973 | Fukatsu et al. | 242/74 |

*Primary Examiner*—Alfred H. Eddleman
*Attorney, Agent, or Firm*—Stevens, Davis, Miller & Mosher

[57] ABSTRACT

A magnetic tape duplicating device in which a recorded master tape and a non-recorded slave tape are wound up on a same take-up reel such that the magnetic surfaces of both tapes are contacted with each other, and a duplicating magnetic field is applied to both wound-up tapes. The leader tapes affixed to the respective leading ends of both master and slave tapes are wound up on an inner reel while the master and slave tapes continuous with the respective leader tapes are wound up on an outer reel positioned outside of the inner reel, whereby stepped portions that would otherwise be produced in the wound-up tapes due to extra thickness of the leader tapes are eliminated.

8 Claims, 12 Drawing Figures

MAGNETIC TAPE DUPLICATING DEVICE

BACKGROUND OF THE INVENTION

This invention relates to a magnetic tape duplicating device for duplicating recorded signals on a master tape onto a slave tape by superimposing the recorded master tape on the non-recorded slave tape such that their respective magnetic surfaces are contacted with each other and then applying a transferring magnetic field to the contacted portions of said tapes. More particularly, it relates to a magnetic tape duplicating device of the so-called simultaneous wind-up and duplicating type in which both master and slave tapes, which are wound on the respective reels, are wound back on a same take-up reel while letting their respective magnetic surfaces contact with each other, and upon completion of the winding up operation, a transferring magnetic field is applied to the pertinent parts of both tapes on the take-up reel while slowly rotating either the take-up reel or the magnetic field generator, thereby to effect duplication of the recorded signals in the master tape on the slave tape.

BRIEF DESCRIPTION OF THE PRIOR ART

A magnetic tape duplicating apparatus of the simultaneous wind-up and duplicating type has recently become the object of attention for its ability of faithful reproductions in a short period of time. In this type of magnetic tape duplicating apparatus, it has been a common practice to affix a fairly thick leader tape to the leading end of each magnetic tape such that said leader tape may serve as a tape guide to allow smooth automatic loading of the magnetic tape.

In this case, as shown in FIG. 12, when the magnetic tape 101 and the leader tape 102 are wound on a same take-up reel 103, a relatively large step 104 is formed at the end of the leader tape 102 due to the difference in thickness between the magnetic tape (30 $\mu$ thick) and the leader tape (170 $\mu$ thick), and hence each turn of the magnetic tape 101 is locally stretched out at such stepped portion. The signals duplicated at such stretched portions of the tape are elongated more than the signals in the other parts of the tape, and when reproduced in a picture, such elongated signals present fine lines traversing the picture to make the latter defective. It has been experimentally proved that such phenomenon would take place over a range of 10 to 15 mm from the stepped portion toward the direction of turn of the tape.

SUMMARY OF THE INVENTION

The present invention has as an object to eliminate the aforementioned disadvantages of the conventional apparatus.

According to the present invention, there is provided a magnetic tape duplicating device which comprises a take-up reel of double construction consisting of an inner reel and an outer reel, and the arrangement is such that leader tapes attached to the leading ends of magnetic tapes are first wound up on the inner reel, and thereafter the magnetic tapes are wound up on the outer reel.

The above and other objects as well as the features of the present invention will become more apparent from the following descriptions with reference to the accompanying drawings.

DETAILED DESCRIPTION OF THE PREFERRED EMBODIMENTS

Figure 1:
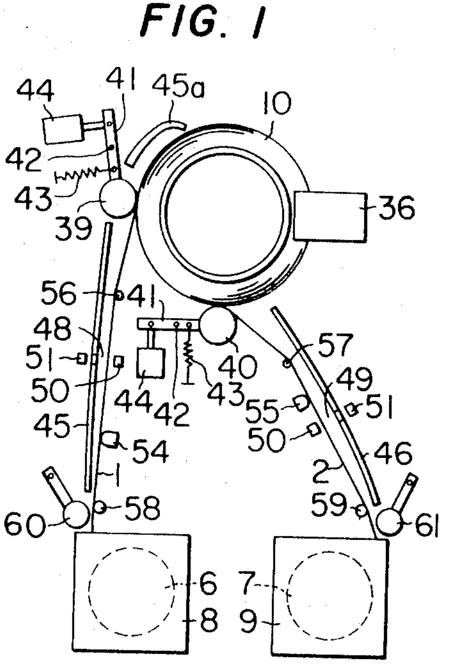
FIG. 1 is a diagrammatic illustration of a magnetic tape duplicating device according to an embodiment of the present invention.

Referring to FIGS. 1 to 8, reference numeral 1 designates a master tape with high coercive force. On the central track of the master tape 1 are recorded FM modulated image signals related to mirror image patterns, and on the tracks along both edges of the tape are recorded relatively low frequency sound signals or control signals. Numeral 2 designates a non-recorded slave tape to which the recorded signals on the master tape 1 are to be recorded. The master tape 1 is longer than the slave tape 2. To the leading ends of said respective tapes 1 and 2 are affixed, for an automatic loading thereof, transparent leader tapes 3 and 4 which are 1 to 1.5 meters long and 170 $\mu$ thick. The leader tapes 3, 4 are greater in thickness than the tapes 1, 2 each of which is 30 $\mu$ thick, and affixed thereto by known means such as an adhesive tape 5. Each of the tapes 1, 2 is provided with transparent portions (not shown) at the front and the rear parts of each signal-recording section of the tape, the transparent portions serving to allow an automatic duplicating operation. The tapes 1 and 2 are wound up on respective reels 6 and 7 which are housed in respective cases 8 and 9. Both reels 6 and 7 are connected to a driving motor (not shown) disposed therebelow.

Reference numeral 10 designates a take-up reel on which the tapes 1 and 2, wound up on the respective reels 6 and 7, are wound with their magnetic surfaces being contacted with each other. As shown in FIGS. 2 to 5, the take-up reel 10 is of a double construction consisting of an inner reel 11 and an outer reel 12, and said reels are arranged on the same horizontal plane. The outer reel 12 may be split into two half-circular reel segments 12$a$ and 12$b$, one 12$b$ of which being movable to define an opening therebetween. A driving pulley 13 is operatively connected to a motor driving the inner reel 11, and the driving pulley 13 is frictionally contacted with a pulley 14 formed integrally with the inner reel 11 so as to transmit rotation of the pulley 13 to the inner reel 11. Numeral 15 designates a circular base block for the outer reel 12. One half part of the base block 15 is formed integrally with or joined to one reel segment 12*a*, and the reel segment 12*b* is able to effect sliding movement along guide means at the other half part of the base block. On the upper surface of the base block 15 is provided a raised portion 16 serving as a guide for sliding movement of the reel segment 12*b*. In the underside of the reel segment 12*b* is formed a dovetail groove 17 for slidably receiving the raised portion 16. Also provided in the base block 15 are a pair of slide shafts 18 serving as additional guide means for the reel segment 12*b*, said slide shafts 18 being received in the holes 19 formed in the reel segment 12*b* through slide bearings 20 which are fitted in the respective holes 19 to facilitate smooth sliding movement of the respective shafts 18. A compression coil spring 21 is provided around each shaft 18 in each hole 19. The spring 21 is compressed between an E-ring 22 secured at an end of the shaft 18 and a stepped portion 23 provided at about the middle of segment 12*b* in said hole 19. The reel segment 12*b* is thus biased by the coil springs 21 against the other segment 12*a* to constitute the outer reel 12. At the corner part of each reel segment at which winding of the respective magnetic tapes 1, 2 around the periphery of the outer reel 12 is initirated, there is formed a part with a relatively large radius to prevent the magnetic tapes 1, 2 from being subjected to sharp bending. Numeral 25 indicates a shaft formed at the center of the underside of the base block 15 integrally therewith, and 26 a bearing of the shaft 25 secured to a base plate 27. Numeral 28 is a pulley joined to the bottom end of the shaft 25, said pulley (28) being connected through a belt 29 to a driving motor for transmitting rotation thereof to the outer reel 12. The latter driving motor is provided independently of the driving motor for the inner reel. Numeral 20 indicates an eccentric cam for effecting opening and closing of the reel segments 12*a* and 12*b* of the outer reel 12. The cam 30 is secured to the top end of a rotatable shaft 31 which extends through the outer reel 12, base block 15 and central hole in the shaft 25. The bottom end of said shaft 31 is joined to a clutch 32 which is connected to a driving power source through gearing 33. Numeral 34 indicates a strip or a guide plate which is formed of a resilient plate and disposed inside the outer reel 12. One end of the guide plate 34 is fixed to a position of the reel segment 12*a* adjacent the inner reel 11. The outer end of the guide plate is secured to an end of the reel segment 12*b* through a spring 35. This guide plate 34 is arranged such that when the reel segments 12*a* and 12*b* are moved away from each other to define an opening therebetween and the leader tapes 3, 4 are led through the opening, the guide plate guides the leader tapes 3, 4 so that they are wound on the inner reel 11 (see FIG. 2), whereas when both reel segments 12*a* and 12*b* are moved to a closed position and the outer reel 12 is rotated, the guide plate 34 presses a part of the peripheral wall of the inner reel 11 to frictionally connect the outer and inner reels together and thereby permitting the outer reel 12 to rotate together with the inner reel 11 (see FIG. 3).

Figure 6:
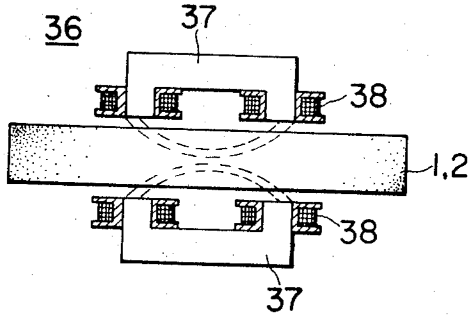
FIG. 6 is a transverse sectional view of a magnetic field generator.

Designated by numeral 36 is a magnetic field generator for applying a transferring magnetic field to the magnetic tapes 1, 2 wound on the take-up reel 10. As shown in FIG. 6, it comprises a core 37 and a winding 38 coiled therearound. When power is applied to said winding 38, there is produced a magnetic field such as shown by broken lines in FIG. 6, and such magnetic field is applied to both magnetic tapes 1, 2 wound on the take-up reel 10.

Numerals 39 and 40 indicate press rollers arranged to press the magnetic tapes 1, 2 wound on the outer reel 12. The peripheral wall of each press roller is channel-shaped to allow positioning of both tapes 1, 2. Each of the press rollers 39, 40 is secured to an end of an arm 41 which has at its middle a fulcrum 42. At a part of each arm 41 positioned closer to the press roller 39 or 40 with respect to the fulcrum 42 is secured a spring 43 biasing the roller 39 or 40 in a direction away from the reel 12. At a part of the arm 41 on the opposite side with respect to said fulcrum 42 is provided a solenoid 44 acting to press the roller 39 or 40 against the reel 12. Normally, both rollers 39 and 40 are held separated from the reel 12 by being biased by the respective springs 43. An even better effect will be obtained if an elastic material such as silicon rubber is provided around the peripheral wall of each of the press rollers 39, 40.

Figures 7, 8:
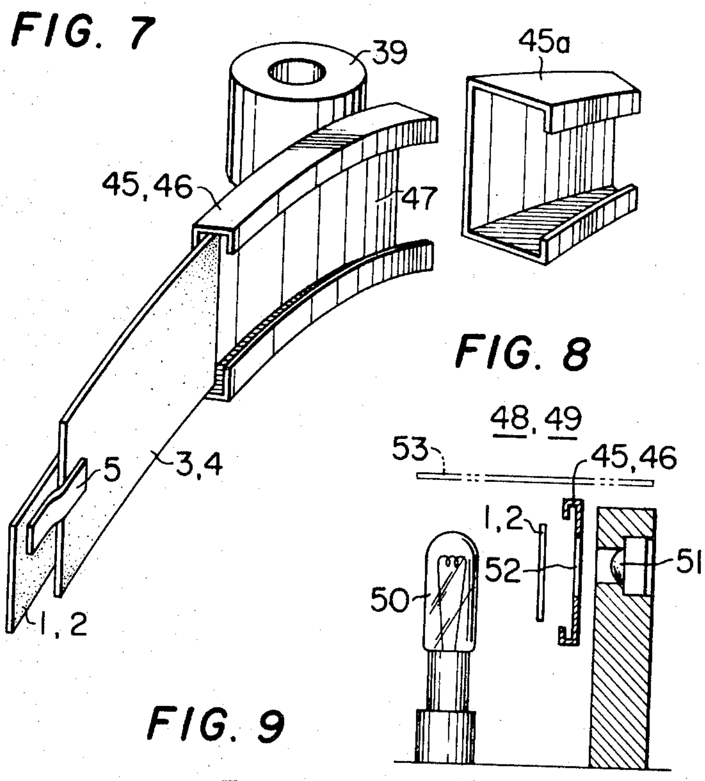
FIG. 7 is a perspective view of a leader tape guide.
FIG. 8 is a transverse sectional view of a tape location detector.

Numerals 45 and 46 designate leader tape guides provided parallel and in close proximity to the passage of the magnetic tapes 1, 2. As shown in FIG. 7, each leader tape guide is formed from a substantially U-sectioned frame-like structure having an opening 47 at its side where each magnetic tape passes. Each guide is so dimensioned that the leader tape 3 or 4, wider than the magnetic tapes 1, 2, can pass through the guide and when the magnetic tape 1 or 2 enters the guide structure, said tape 1 or 2 will go out of the structure through the opening 47 to take the normal passage.

Numerals 48 and 49 designate tape location detectors provided on the passage of the magnetic tapes 1, 2. Each of the detectors consists of a lamp 50 and a phototube 51 disposed on either side of the tape passage. The guide 45 or 46 positioned between the lamp 50 and the phototube 51 has an aperture 52 through which the light from the lamp 50 is passed to the phototube 51. Normally, the light from the lamp 50 is intercepted by the tape 1 or 2 and does not reach the phototube 51, but if the transparent portion provided in the tape 1 or 2 enters between the lamp 50 and phototube 51, the light from the lamp 50 is passed through the transparent portion in the tape and then through the aperture 52 in the guide 45 or 46 to reach the phototube 51. Each part of the device is controlled by the signals detected by the detectors 48, 49 to allow automatic duplicating operations. If each detector 48 or 49 is covered with a shield 53 to shut off any light from the outside, the detection can be effected with high accuracy.

Numeral 54 indicates a reproducing head provided in the passage of the master tape 1, and 55 a recording head provided in the passage of the slave tape 2. Both heads 54 and 55 are arranged such that they are not in contact with tapes 1, 2 when said tapes are being wound up on the take-up reel 10, but they are in contact with the tapes when the tapes are being wound back onto the respective reels 6 and 7.

Numerals 56 and 57 designate guide posts provided on the passages of the tapes 1, 2. 58 and 59 are capstans provided on the respective tape passages adjacent the reels 6 and 7, and 60 and 61 are pinch rollers provided in opposition to the respective capstans 58 and 59. These elements are effective to wind back the tapes 1, 2 at a constant high speed while preventing shifting of the duplicating position of both tapes 1, 2 so as to accomplish the head-head duplicating type transfer when the tapes 1, 2 are wound back on the respective reels 6, 7.

Figure 2:
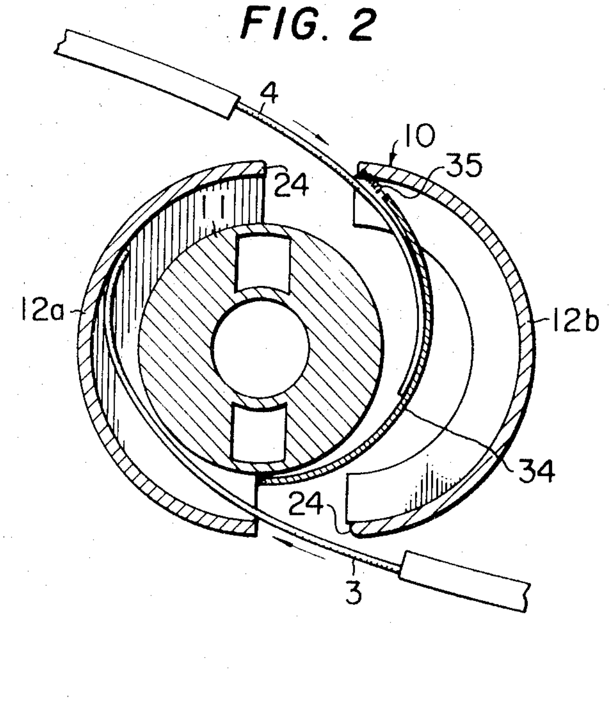
FIG. 2 is a plane view of a take-up reel in said device in which an outer reel is in an opened position.
Figures 3, 4:
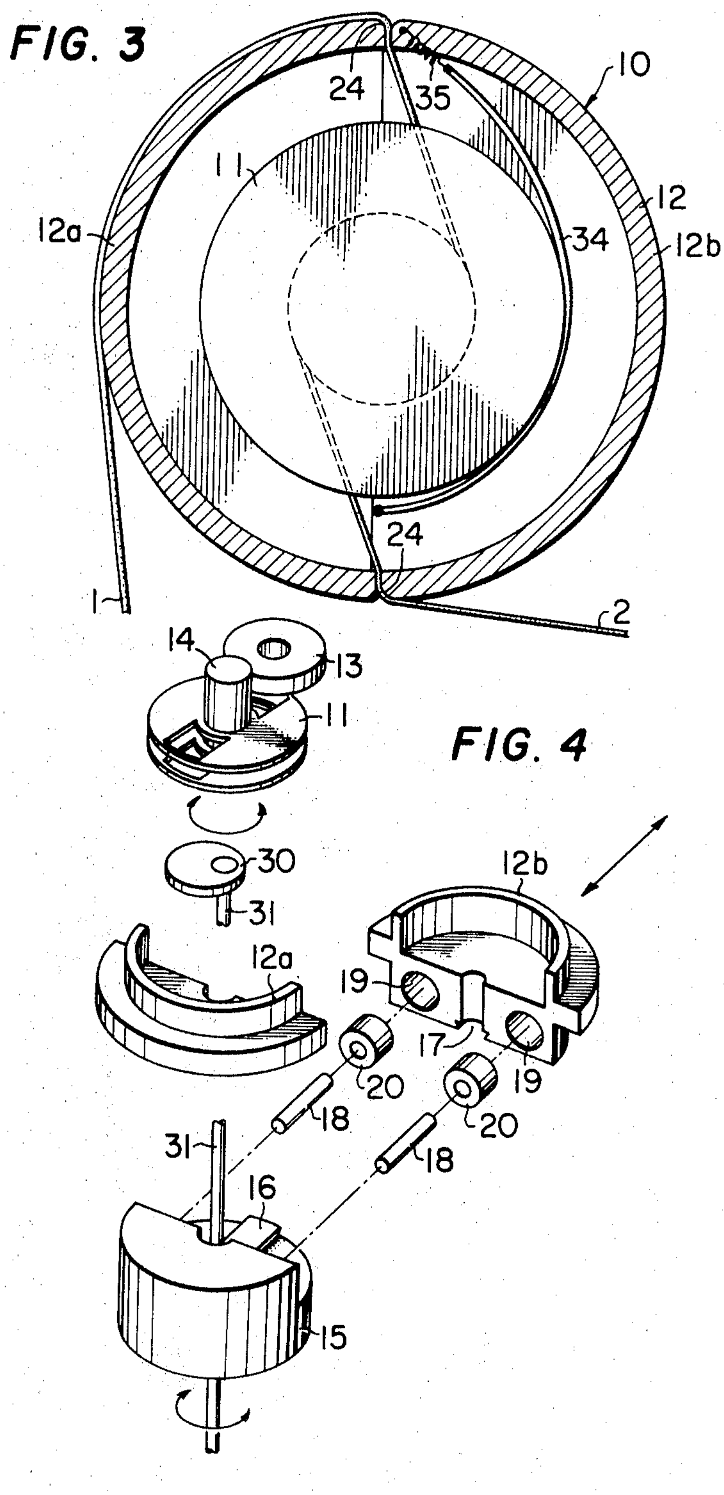
FIG. 3 is a view similar to FIG. 2 in which the outer reel is in a closed position.
FIG. 4 is a perspective exploded view of the take-up reel.
Figure 5:
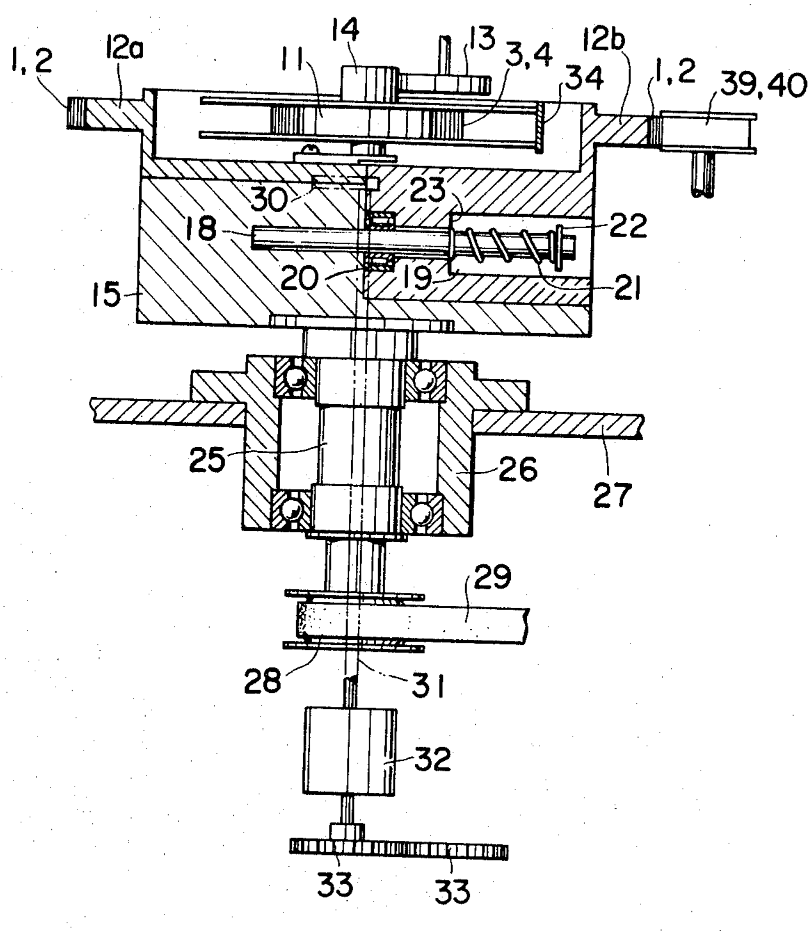
FIG. 5 is a transverse sectional view of said take-up reel.

In operation of the present magnetic tape duplicating device, when a starting button or a starting lever is operated, the clutch 32 shown in FIG. 5 is brought into an engaged or a connected position to rotate the shaft 31 and thereby to separate the reel segment 12*b* of the outer reel 12 from the other reel segment 12*a* by the action of the eccentric cam 30 provided at the top end of said shaft 31. When the reel segment 12*b* reaches a position remote from the segment 12*a*, rotation of the driving power source of the clutch 32 is stopped to put the clutch in a disengaged or released position, thus keeping both reel segments 12*a* and 12*b* apart from each other. At the same time, the driving pulley 13 is rotated, and its rotation is transmitted to the inner reel 11. The tapes 1, 2 wound on the respective reels 6, 7 are operated as follows. Firstly, the leader tapes 3, 4 serving as guiding members of the tapes 1, 2 pass through the guides 45, 46, in turn enter the inside of the reel segments 12*a*, 12*b* through the opening therebetween, and in turn are wound up on the inner reel 11 which is rotating at a low speed, while being guided by the guide plate 34 as shown in FIG. 2. When the magnetic tapes 1, 2 enter the respective guides 45, 46, the tapes 1, 2 move out of the opening 47 in the respective guides 45, 46 and travel along the passages defined by such as the guide posts 56, 57 as shown in FIG. 1. After both leader tapes 3, 4 have been completely wound up on the inner reel 11, the front transparent sections of the respective magnetic tapes 1, 2 pass the respective detectors 48, 49. At that time, as shown in FIG. 8, the light from the lamp 50 passes through the front transparent section of each tape 1 or 2 and through the aperture 52 in each guide 45 or 46 to reach the phototube 51. As it is detected by the detectors 48, 49 that both leader tapes 3, 4 have been completely wound up on the inner reel 11, rotation of the inner reel 11 is stopped after a certain predetermined period of time by utilizing the detected signal, and the clutch 32 shown in FIG. 5 is again brought into the engaged position to turn the eccentric cam 30 so as to join the reel segment 12*b* to the other reel segment 12*a* by dint of the restorative force of springs 21 and thereby to form the outer reel 12. Consequently, the guide plate 34 secured to the outer reel 12 as shown in FIG. 3 is pressed against a part of the peripheral wall of the inner reel 11 to frictionally join both reels 11 and 12.

At the same time, the solenoids 44, shown in FIG. 1 are energized to perform the attracting operation to let the press rollers 39, 40, which have been held away from the outer reel 12, press against the peripheral wall of the outer reel 12 through the tapes 1, 2. Then, both outer and inner reels 12 and 11 are rotated together at a high speed by the driving motor of the outer reel 12 and the tapes 1, 2 are wound up on the outer reel 12 such that the magnetic surfaces of both tapes are in contact with each other. While the tapes are being wound, back tension is applied to the respective tapes by the driving motors of the reels 6, 7. The press rollers 39, 40 are pressed against the tapes 1, 2 on the outer reel 12 to remove the air between the tapes to allow them to adhere intimately to each other, while the positioning of the tapes 1, 2 is accomplished by the channel-shaped structure of the rollers.

When the signal-recorded portion of the master tape 1 is fully wound up on the outer reel 12 and the transparent section of the tape 1 passes the detector 48, both inner and outer reels 11 and 12 are switched from the high speed rotation to the low speed rotation by the detected signal from the detector 48. At the same time, a magnetic field is applied to the magnetic tapes 1, 2 on the outer reel 12 by the transferring magnetic field generator 36, whereby mainly the image signals on the master tape are transferred onto the slave tape 2. The intensity of the magnetic field must be controlled such that the transfer to be effected between the tightly attached magnetic surfaces of two tapes and the magnetic surfaces of the two tapes which are apart will not be effected, and that the recorded signals on the master tape 1 will not be erased.

When the simultaneous wind-up and duplicating operation on the take-up reel 10 is completed, the respective tapes 1 and 2 are wound back onto the respective reels 6 and 7 at a relatively high constant speed through the capstans 58, 59 and pinch rollers 60, 61. During this rewind operation, back tension is imparted to the respective tapes 1, 2 by the driving motor of the outer reel 12. As the tapes 1, 2 are wound back onto the respective reels 6, 7, the heads 54, 55 are contacted with the respective tapes 1, 2 so as to reproduce the sound and control signals on the master tape 1 by the reproducing head 54, and to re-record them on the slave tape 2 through the recording head 55. It is possible to provide an erasing head slightly before said head 55 in the slave tape passage, thereby to temporarily erase the sound and control signals which have been weakly transferred on both ends of the slave tape 2 by the abovementioned simultaneous wind-up and copying operation.

When both tapes 1, 2 are substantially wound back on the respective reels 6, 7 and the front transparent sections of both tapes 1, 2 pass the respective detectors 48, 49, the capstans 58, 59 are deenergized by the detected signal to stop rotation of both capstans 58, 59, whereby transfer of the sound and control signals is completed and the inner and outer reels 11, 12 are switched from the high speed rotation to the low speed rotation. After the lapse of a predetermined time period, both inner and outer reels 11, 12 are stopped, with the outer reel 12 taking the same position as is taken before its operation. In this embodiment, a delay relay is used for stopping the outer reel 12 correctly at its original position.

When the reels 11, 12 stop, the clutch 32 is brought into the engaged position to turn the eccentric cam 30 and to open or separate the reel segments 12*b* from 12*a*. This makes the inner reel 11 in a free state, namely in a state not joined to the outer reel 12. When the reel segment 12*b* is opened from the reel segment 12*a*, the clutch 32 is brought into the disengaged position, keeping both reel segments 12*a*, 12*b* open or separate from each other. Then, the driving pulley 13 is rotated by the driving motor to rotate the inner reel 11 alone in the direction opposite to the direction of rotation at the time of starting, whereby the leader tapes 3, 4 are wound back on their respective reels 6, 7. The entire duplicating operation is thus completed and then the slave tape is changed for the next copying operation.

Figure 9:
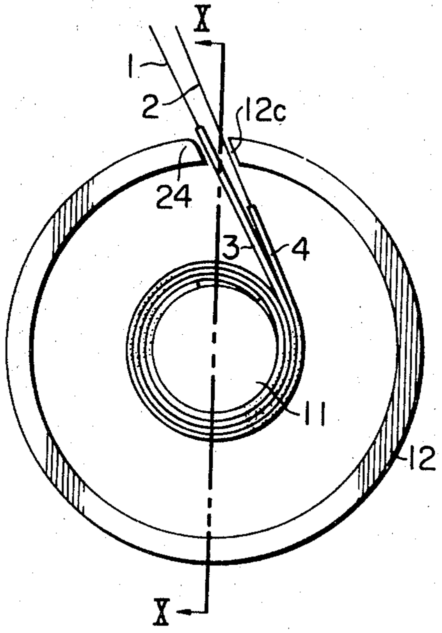
FIG. 9 is a plane view of another embodiment of the take-up reel.

FIG. 9 shows another embodiment of the takeup reel 10. In this embodiment, a slit 12*c* is provided at a part of the outer reel 12 so as to pass the leader tapes 3, 4 therethrough and then wind them on the inner reel 11. At the moment when the leader tapes 3, 4 are wound up on the inner reel 11, both inner and outer reels are rotated together to wind up both magnetic tapes 1, 2 on the outer reel 12.

Figures 10, 11, 12:
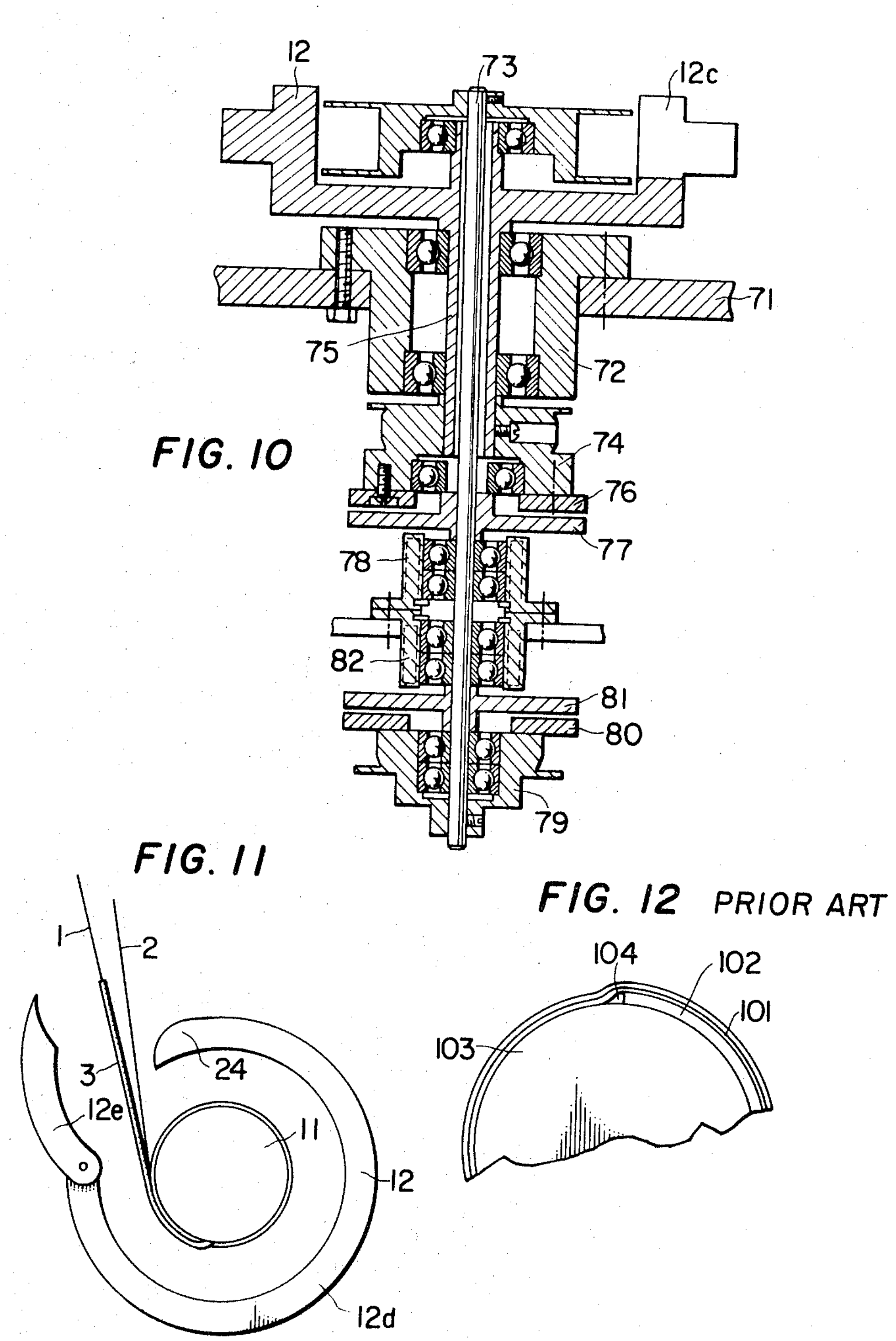
FIG. 10, FIG. 11, FIG. 12 PRIOR ART
FIG. 10 is a sectional view taken along the line X—X in FIG. 9.
FIG. 11 is a plane view of a further embodiment of the take-up reel.
FIG. 12 is a plane view of the conventional take-up reel.

FIG. 10 is a sectional view taken along the line X—X in FIG. 9. As will be seen, the outer reel 12 is rotatably borne by a bearing 72 provided on a base plate 71, while the inner reel 11 is secured to a rotatable shaft 73 which extends through a shaft 75 of the outer reel 12. In this figure, numeral 74 indicates a pulley provided on the shaft 75 of the outer reel 12, and a magnetic plate 76 is secured to the pulley. 77 designates a clutch disc, secured to the shaft 73, which is opposite and adjacent to the magnetic plate 76. 78 is a first electromagnetic clutch, and 79 a pulley provided rotatably on the shaft 73, said pulley 79 carrying a magnetic plate 80. 81 designates a clutch disc, secured to the shaft 73, which is opposite and adjacent to the magnetic plate 80, and 82 a second electromagnetic clutch.

When winding up the leader tapes, the outer reel 12 is held locked. Under this condition, when power is connected to the second electromagnetic clutch 82, the disc 81 and magnetic plate 80 are attracted to bring the pulley 79 and shaft 73 into a mechanically joined state, and hence the inner reel 11 alone can be rotated by driving the pulley 79. For rotating the outer reel 12, power to said second electromagnetic clutch 82 is cut off, and under this condition, when power is connected to the first electromagnetic clutch 78, the disc 77 and magnetic plate 76 are attracted to bring the pulley 74 and shaft 73 into a mechanically coupled state, and hence if under this condition the pulley 74 is rotated, both inner and outer reels 11, 12 can be rotated together.

FIG. 11 shows still another embodiment of the takeup reel 10. In this embodiment, the outer reel 12 is divided into a large reel segment 12*d* and a small rel reel segment 12*e*. One end of the small segment 12*e* is pivotally connected to an open end of the large segment 12*d*, such that an opening of the large reel segment 12*d* will be formed by pivoting the small segment 12*e*. The arrangement is such that the leader tapes 3, 4 may be passed through said opening and wound up on the inner reel 11, and at the moment when the leader tapes 3, 4 have been wound up on the inner reel 11, the small reel segment 12*e* is turned to the closed position to form the outer reel 12; thereafter both inner and outer reels 11, 12 are rotated together thereby to wind up the magnetic tapes 1, 2 on the outer reel 12.

In the above described embodiment, there is used the tape location detectors of the type in which tape location is detected according to the presence or absence of the light passing through the transparent sections in the tapes; however, it should be understood that there may be used tape location detectors of the type in which signals recorded on the tapes are detected through a head.

As described above, according to the present invention, the leader tapes affixed to the leading ends of the respective magnetic tapes are first wound up on the inner reel and then, after said leader tapes have been wound up on said inner reel, the magnetic tapes are wound up on the outer reel, so that there is no possibility that the magnetic tapes will be locally stretched out by the ends of the leader tapes, and faithful reproductions can be effected.

We claim:

1. A magnetic tape duplicating device comprising:
a master reel on which a master tape is wound;
a slave reel on which a slave tape is wound;
leader tapes affixed to the respective leading ends of said master and slave tapes;
an inner take-up reel on which both said leader tapes are wound;
an outer take-up reel on which both said master and slave tapes following the leader tapes are wound, said outer take-up reel being disposed around said inner reel substantially concentric therewith with a space defined therebetween for permitting both said leader tapes to be wound on said inner reel;
opening means provided to said outer reel through which both said leader tapes pass from the outside of said outer reel to said inner reel;
first means for independently rotatably driving said inner and outer reels;
second means for joining and rotatably driving said inner and outer reels together;
a transferring magnetic field generator for applying a transferring magnetic field to both tapes wound up on said outer reel with their respective magnetic surfaces contacted with each other; and
a rewind means for winding back the tapes wound up on the respective outer and inner reels onto the respective master and slave reels.

2. A magnetic tape duplicating device according to claim 1, wherein said inner and outer reels are arranged to be rotated integrally with or independently from each other by clutch means.

3. A magnetic duplicating device according to claim 1, wherein said outer reel includes bisected members, at least one of which is arranged slidably in a diametric direction to the other member, said opening means including at least one opening for passing both said leader tapes from the outside of said outer reel to said inner reel when at least one said slidable bisected member slides in a diametrically outward direction, and said second means includes a strip having substantial resiliency positioned between both said members such that said strip frictionally engages said inner reel at a predetermined angle when both said members come to a closed position.

4. A magnetic tape duplicating device according to claim 1, wherein said outer reel includes split members, at least one of which is arranged slidably in a diametric direction to the other member, said opening means including at least one opening for passing both said leader tapes from the outside of said outer reel to said inner reel when at least one said slidable split member slides in a diametrically outward direction.

5. A magnetic tape duplicating device according to claim 4, wherein the sliding movement of said member is effected by the rotation of a cam about the rotational center of said outer reel.

6. A magnetic tape duplicating device according to claim 4, wherein said opening includes different slits defined between the split members when at least one said slidable split member slides in a diametrically outward direction, and said respective leader tapes are led to the inner reel through said different slits.

7. A magnetic tape duplicating device according to claim 1, wherein said opening means is a slit fixedly formed in said outer reel, and the leader tapes affixed to both said master and slave tapes are led through said slit onto the inner reel.

8. A magnetic tape duplicating device according to claim 7, including means for opening and closing said slit.

* * * * *